Aug. 8, 1967 D. G. HAENSCHKE 3,335,234

AUTOMATIC MONITORING CIRCUIT FOR STEP-BY-STEP TELEPHONE SYSTEMS

Filed Nov. 26, 1963 3 Sheets-Sheet 1

INVENTOR
D.G. HAENSCHKE
BY Howard R Popper
ATTORNEY

AUTOMATIC MONITORING CIRCUIT FOR STEP-BY-STEP TELEPHONE SYSTEMS

Filed Nov. 26, 1963

3 Sheets-Sheet 2

1

3,335,234

AUTOMATIC MONITORING CIRCUIT FOR STEP-BY-STEP TELEPHONE SYSTEMS

Detlev G. Haenschke, Atlantic Highlands, N.J., assignor to Bell Telephone Laboratories, Incorporated, New York, N.Y., a corporation of New York Filed Nov. 26, 1963, Ser. No. 325,866

17 Claims. (Cl. 179—175.2)

This invention relates to telephone systems and more particularly to monitoring and trouble detection circuits for use in step-by-step central offices.

A vast portion of the world telephone plant consists of step-by-step switches and offices. Some of the more recently developed telephone systems, employing common control equipment, include circuits for detecting malfunctions in the various system operations. In general, such equipment is not provided for step-by-step offices. When trouble conditions are reported the malfunctioning equipment is usually identified only as a result of the investigation of a maintenance man. Often, trouble conditions are not even reported. Routine tests which require considerable manpower are at the present time the chief means of discovering troubles in step-by-step offices.

With the advent of direct distance dialing, it has become apparent that trouble detection and recording in step-by-step offices must be brought up to that level found in the newer switching systems. Subscribers must be given efficient service, and this is not possible if the improperly operating step-by-step switches included in a telephone connection, which may involve many different types of central offices, cannot be identified and repaired.

It is a general object of this invention to provide an improved trouble detection circuit for a step-by-step telephone central office.

It is another object of this invention to provide a circuit for automatically tracing the progress of a call through a step-by-step office.

It is another object of this invention to verify whether the switching path actually set up over the switches in a step-by-step switching train corresponds to the controlling signaling information, e.g., dial pulses.

It is another object of this invention to automatically identify faulty step-by-step switching equipment contributing to ineffective call attempts and to provide a record of the malfunctioning switches in each ineffective call attempt.

It is still another object of this invention to provide automatic trouble detection equipment for step-by-step offices requiring no major modifications of existing step equipment.

In general, there is no uniformity in the switching plans of step-by-step offices. Not only are the wiring plans of the various offices different from one another, but the individual switches used in the various offices are also of many different types. The invention, as will become apparent, may be used in step-by-step offices having different wiring plans and employing different types of switches. Almost all step offices have a series of selectors which are engaged in sequence as the switching train develops. The last stage is often a connector, as it is in one hereinafter described illustrative embodiment of my invention, the positions on which connector are connected to respective subscribers. In a typical office the selectors and connectors make vertical and rotary steps. A first dialed digit causes a first selector to make a number of vertical steps corresponding to the value of the dialed digit. The selector then hunts in a rotary fashion until an idle position on the switch or an idle path is found. This path is connected to a second selector. The second dialed digit is transmitted over the path established by the first selector to the second selector, and causes the second selector to take a number of vertical steps corresponding to the second dialed digit. The second selector then hunts in a rotary fashion until it finds idle terminals connected to still another selector or connector. The last stage of the train, a collector, operates in a similar fashion. However, in the case of the connector the rotary steps are also controlled by a dialed digit. The next to last digit controls the vertical steps of the connector, and the last digit controls the rotary steps to direct the switching train to the line equipment of the particular called subscriber.

In the illustrative embodiment of the invention a monitoring circuit is provided which is selectively connectable to the first selectors in the office. The monitoring equipment is automatically connected to a first selector when the selector is first seized. It remains so connected until switching is completed and, if completed incorrectly, until the trouble is recorded. At this time the monitoring equipment is made available for the first selector which is next seized.

In a typical office all dial pulses are transmitted over the tip and ring conductors of the first selector. Because the communication path through the switching train is developed from the first selector, all dial pulses which are transmitted to operate succeeding selectors must go through the first selector. Accordingly, the signaling information transmitted by the calling party is made available to the monitoring equipment located at the first selector. To verify that the communication path through the swtiching train is developing in accordance with this information, it is necessary to trace the progress of the call through the selectors and the final connector. A circuit is provided in each selector and connector to apply to the tip conductor of the respective switch a number of pulses corresponding to the number of vertical and rotary steps taken by the switch. Due to the time delay between the end of the vertical stepping and the beginning of the rotary hunting, and between the cut-through from one switch to a succeeding switch and the vertical stepping of this next switch, the pulses are applied to the tip conductors of the switches in groups corresponding to the vertical and rotary steps. As the communication path through the switching train develops, all of the pulses applied to the tip conductors of succeeding switches are transmitted back through the train to the tip conductor of the first selector. All of these pulses are thus available on the tip conductor of the first selector to which the monitoring equipment is connected. The monitoring equipment is thus able to compare the progress of the call through the office with the signaling information controlling it. The monitoring equipment has access to both the dial information and the stepping information because all dial pulses transmitted along the developing switching train pass through the first selector, and all stepping pulses representing the steps taken by respective switches are transmitted back through the developing switching path over the tip lead from the respective switches to the first selector.

Although the selective connection of the monitoring equipment to the first selectors in the office enables the monitoring equipment to gain access to both dial and step information, it is still necessary to provide circuitry in each selector and connector for applying to the tip of the respective switch pulses representing the stepping action taken by the switch. This necessitates a modification of each selector and connector in the office. However, in accordance with my invention, the modification is so simple that the highly efficient trouble detection system of the invention is achieved at a very meager cost.

Each selector and connector in the office is modified by the coupling of the vertical and rotary magnet coils to the switch tip conductor. At present in a typical step-by-step switch, each time the vertical or rotary magnet releases after a step, the energy stored in the magnet coil results in a relatively large induced voltage spike across the coil. It has been found that this large spike tends to reduce the life of the contacts controlling the operation of the magnet, these contacts appearing across the magnet coil. For this reason in present step-by-step systems a contact protection network is already connected to each of the magnet coils for the purpose of reducing the magnitude of the voltage spike across each coil after a step is completed. The magnitude of the voltage spike across the contact protection network is still relatively large. It is part of the energy of this spike which I couple to the tip conductor in each switch. The connecting network consists only of a capacitor, a resistor, and a diode. Thus the unwanted voltage spikes of the past are advantageously utilized in my invention to derive pulses indicative of the steps taken by each selector and connector in the office connected to the first selector of the switching train being monitored. The monitoring equipment simply counts and stores the number of vertical and rotary steps of each selector and connector. It also counts and stores the dialed digits. A match between the dialed digits and the resulting vertical and rotary steps enables the monitoring equipment to determine whether the step equipment is operating properly.

The number of vertical steps of each selector and the number of vertical and rotary steps of the connector at the end of the switching train must correspond with the dialed digits. Also, vertical stepping of a selector must be followed by at least one rotary step, namely the rotary hunting action. If any steps do not correspond with the dialed pulses, or if there are no rotary steps, the malfunctioning switch is easily determined after the identity of the monitored first selector and the dial and stepping information are punched out on a paper tape, or equivalent data record. A maintenance man, or additional automatic equipment, has available both the dialed information, i.e., what the vertical steps of the selectors and the vertical and rotary steps of the connector should have been, and the step information, i.e., what the switches actually did. Because the rotary steps of the selectors are recorded, even though they do not correspond to dial pulse information, the exact progress of the call may be determined with reference to the particular office wiring plan.

For example, suppose the dial information comprises the digits 2567. Suppose that the step information transmitted back along the switching train to the monitoring equipment consists of the following sequence of sets of pulses; 2, 8, 5, 4, 5, 7. The monitoring equipment checks the dialed digit 2 against the number of vertical step pulses derived from the operation of the vertical magnet of the first selector. The monitoring equipment then registers eight step pulses corresponding to the rotary steps taken by the first selector. The digit 8 however is not compared with any dialed digit as the hunting of the first selector is independent of signaling information. The first selector has operated properly because the number of vertical steps taken by this switch corresponds to the first dialed digit, and vertical stepping was followed by the rotary hunting action.

The next number of step pulses (five) is compared with the second dialed digit. The next number of step pulses (four), representing the rotary steps taken by the second selector, is recorded by the monitoring equipment but not compared with any dialed digit. Again, the monitoring equipment assumes that the switches are operating properly.

The next number of step pulses (five), corresponding to the same number of vertical steps taken by the connector, is compared with the third digit of the dialed information. The third digit is a 6 and thus the monitoring equipment determines that the connector has operated improperly in its vertical stepping sequence. The dial pulse information as well as the stepping information may be punched out at this time, although it may be delayed until it is determined whether the rotary stepping sequence of the connector corresponds to the last dialed digit, a 7. If the correspondence does not exist it is determined that the rotary stepping of the connector is improper as well as the vertical stepping. (If desired, the calling party may be provided with busy tone in response to the detection of an error by the monitoring equipment, rather than ringing a wrong called party.)

Once the information is punched out by the monitoring equipment, a maintenance man or additional automatic equipment may determine precisely which switch has operated improperly. The wiring plan reveals each step switch from the number of vertical and rotary steps of the preceding step switches. More precisely, the wiring plan of the office reveals the connections between the terminals of the various first selectors, and the tip and ring conductors of the second selectors. Similarly, the wiring plan reveals the particular connectors connected to the output terminals of the various last selectors. Because the identity of the first selector and the vertical step pulses have been recorded as well as the rotary step pulses, it can be determined from the first pair of vertical and rotary steps (two and eight) which second selector has been brought in the switching train. The second pair of vertical and rotary step pulses (five and four) derived from the operation of the particular second selector already identified, enables the particular malfunctioning connector to be isolated. This connector may now be individually tested and replaced if necessary.

There is one situation in which the erroneous operation of the switches cannot be attributed to a failure in step equipment. If mutilated or incomplete dial pulses are received, it is expected that the switch operations will not correspond to the signaling information. Accordingly, in the illustrative embodiment of the invention a dial pulse analyzer is provided to analyze the validity of incoming dial pulses. If invalid dial pulses are received, e.g., pulses having too extreme a make/break ratio, improper inpulsing speed, or an insufficient number of digits, the punch operation can be inhibited. In this manner a good switch is not identified as operating improperly. If desired, a punch can be made when invalid dial pulses are received, which shows the type of inpulsing trouble together with the identity of the first selector. From the identity of the first selector it is possible in many cases to trace the source of the invalid dial pulses to the circuit over which the invalid dial pulses were received.

It is a feature of this invention to provide monitoring equipment connectable to the first selectors in a step-by-step telephone central office.

It is another feature of this invention to provide means in the monitoring equipment for recording all dial pulses transmitted to a first selector, and through the first selector to all succeeding switches in the developing switching train.

It is another feature of this invention to provide means for coupling signals representing the actual operations of the vertical and rotary magnets of the switches in a step-by-step switching train back through the transmission path developed by the operation of the switches without affecting the transmission of voice or data, or causing interference in the normal switching operation.

It is another feature of this invention to provide means in the monitoring equipment for registering all of the vertical and rotary stepping signals sent back through the developing switching train to the first selector, and for comparing these signals with the original dial pulses causing the stepping operations.

It is another feature of this invention to punch out the dial pulse and stepping pulse information registered in the monitoring equipment for any call when the digits represented by the dial pulses do not correspond to the number of steps taken by the various switches as represented by the vertical stepping pulses derived from the stepping of all selectors and the connector in the switching train, and the rotary stepping pulses corresponding to the rotary steps taken by the connector, or when no rotary stepping pulses are detected after vertical stepping of a selector.

It is still another feature of this invention to provide means for analyzing the validity of dial pulses received, and in response to the receipt of invalid dial pulses to either (a) inhibit the punch operation of the monitoring equipment even though the registered stepping pulses do not correspond to the registered dial pulses, or (b) punch the identity of the first selector on which invalid dial pulses are observed together with the type of inpulsing irregularity.

Further objects, features and advantages of the invention will become apparent upon consideration of the following detailed description in conjunction with the drawing, in which.

Figure 1:
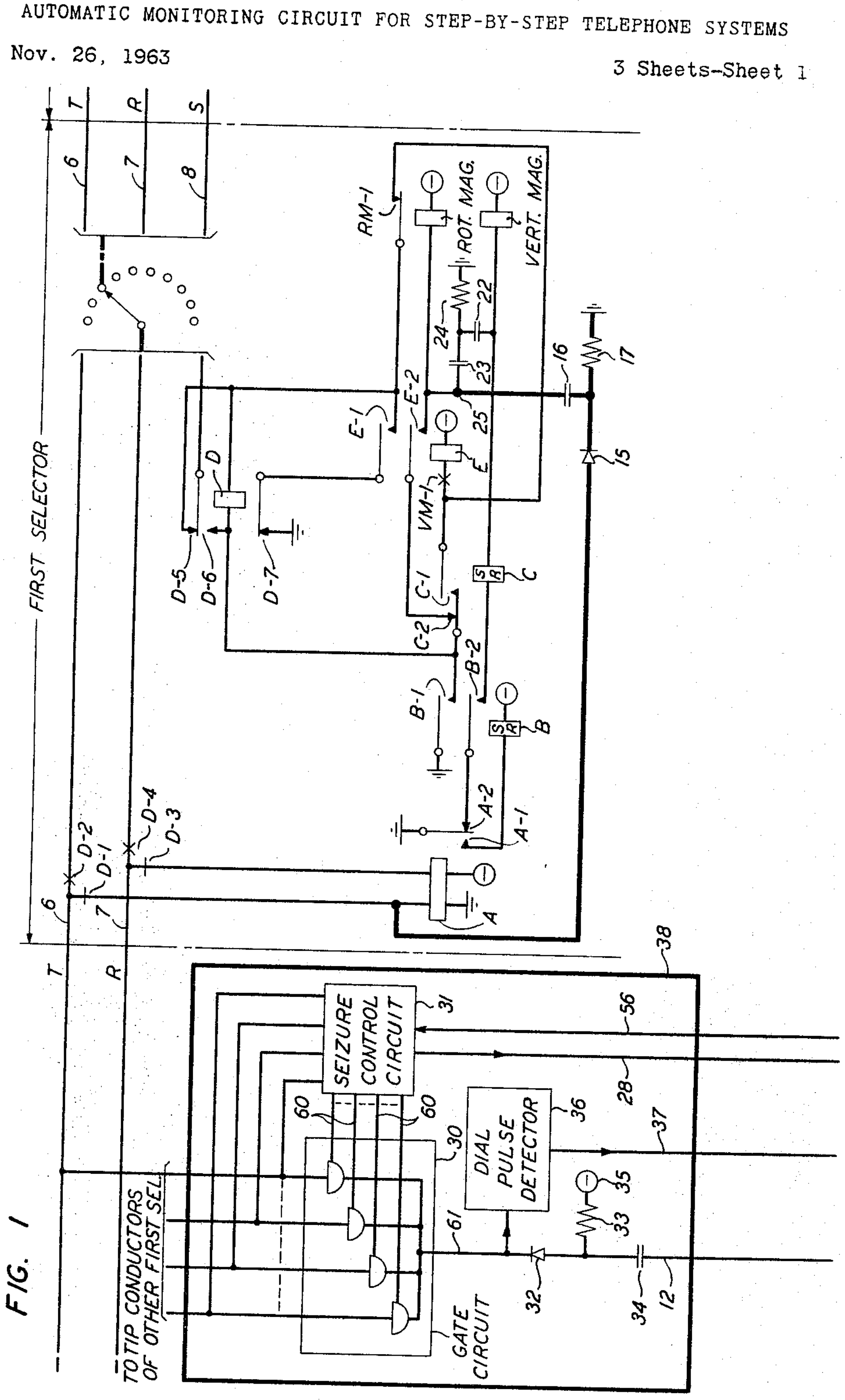
FIGS. 1 and 2 represent a switching train in an illustrative step-by-step central office, with the lower left-hand portion representing part of the monitoring equipment, to be connected with the remainder of the monitoring equipment which is shown in FIG. 3.
Figures 2, 5:
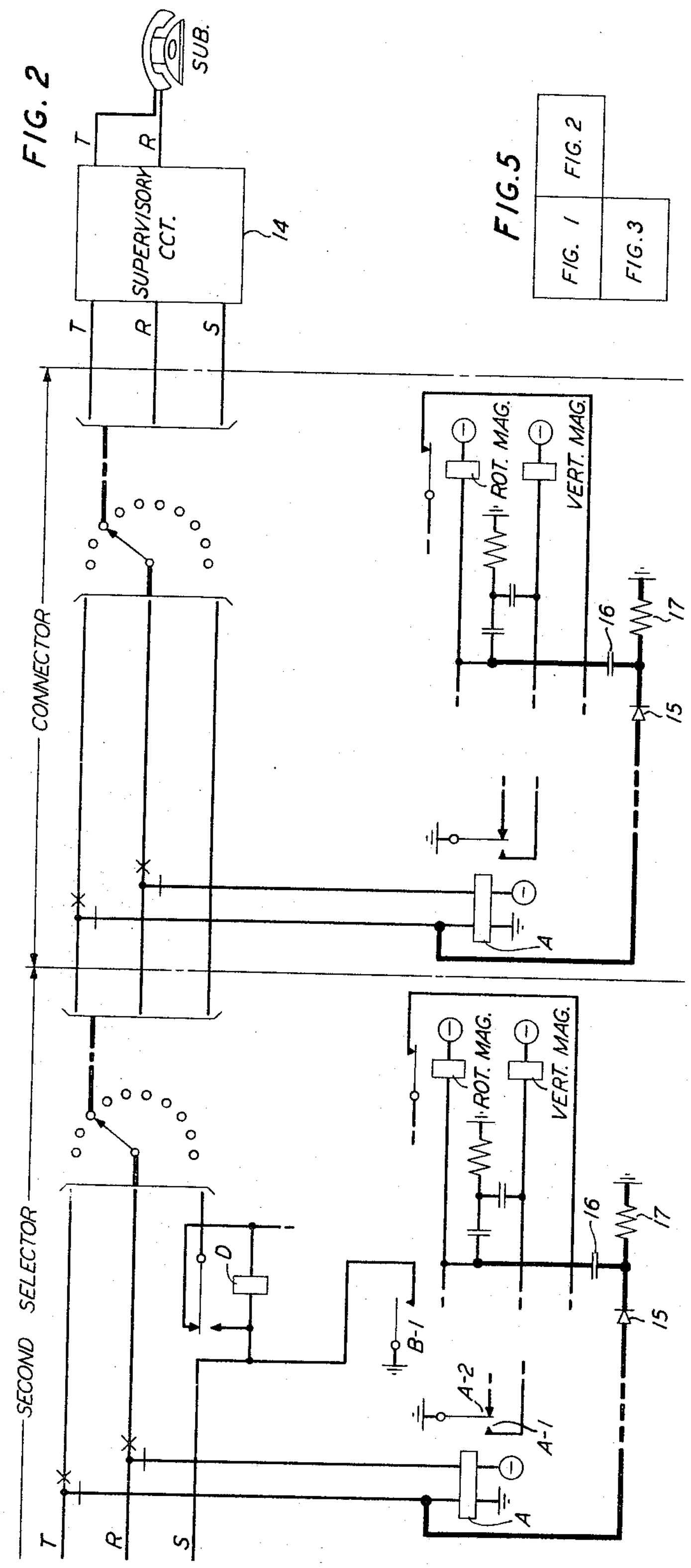
FIG. 5 shows the arrangement of FIGS. 1–3.

The only equipment in FIGS. 1 and 2 added to existing central office equipment is shown by the heavy lines. This equipment includes a diode 15, a capacitor 16, and a resistor 17 in each selector and connector, and the monitoring equipment within box 38.

The first selector shown in FIG. 1 is seized with the connection through a line finder, trunk circuit, etc. of the tip and ring conductors 6 and 7. The tip, ring and sleeve conductors of each first selector are selectively connectable to a plurality of second selectors depending upon the number of vertical and rotary steps taken by the switch. (More than one first selector may be multipled to the same second selector.) When a first selector is first seized the tip and ring conductors 6 and 7 are connected through normally closed contacts D–1 and D–3 of the cut-through relay D to the windings of relay A. The dial pulses operating relay A control the vertical stepping. This vertical stepping is followed by rotary hunting which determines the particular second selector to which tip, ring and sleeve conductors 6, 7 and 8 are connected after cut-through relay D operatees, and contacts D–2 and D–4 close.

Similar remarks apply to the second selector shown in FIG. 2. The second selector may be connected to any one of many connectors depending upon the vertical and rotary stepping. Although in the illustrative embodiment of the invention the second selector is shown connected directly to a connector, the invention is equally applicable to any step-by-step central office, e.g., one having more than two selectors in a switching train. The second selector and connector shown in FIG. 2 are not shown in as much detail as is the first selector of FIG. 1. The second selector may be similar to the first selector. The connector is also similar in operation, although the rotary stepping is controlled by dial pulses as well as the vertical stepping. The particular manner of control of the vertical and rotary stepping of the connector need not be described in detail for an understanding of the principles of the invention. Accordingly, the various relays controlling the stepping of the vertical and rotary magnets in the connector are not shown in FIG. 2.

Relay A of the first selector operates when the selector is seized. Contacts A–1 close and slow-release relay B operates. Each time a dial pulse appears in the line, relay A releases. Contacts A–2 close, and as contacts B–2 remain closed, slow-release relay C and the vertical magnet are both energized. Relays B and C remain operated for the duration of the dialed digit as both of these relays are slow to release. The vertical magnet takes a number of steps equal to the number of closures made by contacts A–2, i.e., the number of pulses in the dialed digit.

During the vertical stepping relay E is operated through contacts VM–1, C–1 and B–1. Contacts VM–1 close when the first vertical step is taken, and remain closed until the switch is released. By the time contacts VM–1 close, contacts B–1 and C–1 are closed and ground potential is extended to the winding of relay D via contact RM–1 to prevent it from operating in series with relay E. Relay D may operate only after relay C releases. Relay E locks through its own contacts E–1, and contacts D–7 and RM–1. As soon as the dial pulses cease, relay C releases after a slight interval. When contacts C–2 close the rotary magnet ROT. MAG. is operated through contacts E–2, C–2 and B–1. When the rotary magnet operates contacts RM–1 open, and relay E releases. As contacts E–2 are now open, the rotary magnet de-energizes. During this operation the rotary hunting has proceeded one step. If the first choice second selector reached in the rotary hunting is busy, a ground appears on sleeve 8. Ground potential is transmitted through contacts D–5 and RM–1 to the winding of relay E. Relay E reoperates, and when contacts E–2 close the rotary magnet energizes again through contacts E–2, C–2 and B–1. When contacts RM–1 open relay E releases. If the next second selector is also busy a ground potential is again applied to sleeve 8 for reoperating relay E, which in turn controls another rotary step.

This automatic stepping or hunting action continues until an idle second selector is found, one which does not apply a ground potential to sleeve 8. At this time relay E does not reoperate. Ground potential is no longer provided through contacts D–5 to the junction of contacts E–1 and RM–1. Instead, the ground potential is supplied through contacts B–1, the winding of relay D, contacts RM–1 and VM–1 and winding of relay E for controlling the operation of relay D. Relay E is marginal however and does not operate in series with the winding of relay D. Only relay D operates. Contacts D–6 close and the winding of relay D is connected to the sleeve of the second selector. When relay D operates, contacts D–2 and D–4 close, and the tip and ring of the first selector are cut through to the tip and ring of the second selector. Relays A and B in the second selector operate. The second and all succeeding switches are different from the first selector in that the junction of contacts B–1 and the winding of relay D is connected to the sleeve extended to the previous switch. Although when relay D in the first selector operates and relays A and B release the ground potential through contacts B–1 is removed, a ground is now extended through the same contacts in the second selector to the sleeve of the first selector. As contacts D–6 are closed this ground maintains relay D in the first selector operated. Relay B in the second selector operates before relay B in the first selector releases so that relay D in the first selector remains operated. Contacts D–1 and D–3 in the first selector open and relays A, B, C and E are released. Only relay D remains operated from the ground potential on the sleeve extended back from the second selector to the D winding, contacts RM–1, and the winding of relay E. Relay D releases when the call is terminated and the ground potential is removed from the sleeve lead. A release circuit, not shown in the drawing, is provided to restore the switch when relay D de-energizes at the end of the call.

The second selector operates in a manner similar to that of the first selector responsive to the second dialed digit. After the second selector has made a number of vertical steps corresponding to the second dialed digit, rotary hunting begins, the rotary hunting terminating only when an idle connector is reached. The connector operates in a manner similar to that of the selectors except that the rotary magnet, instead of hunting for an idle outlet, is controlled by a dialed digit (the last). When cut-through from the connector to the supervisory circuit 14 is achieved, the ground for holding all switches in the train is applied by the supervisory circuit to the sleeve lead. This ground is removed at the end of the call, at which time all of the operated relays D in the train release.

When contacts A-2 on any switch close, the vertical magnet operates and the switch takes one vertical step. Before the switch takes another vertical step the vertical magnet releases. Contacts A-2 open at the termination of each dial pulse. With the sharp drop of current through the winding of the vertical magnet a large voltage spike would ordinarily appear across the coil. The magnitude of this spike may be in the hundredss of volts, and would ordinarily damage contacts A-2. For this reason a contact protection network is already provided in most existing step-by-step switches. This network includes capacitor 22 and resistor 24. The capacitor-resistor combination dissipates the energy stored in the vertical magnet winding when contacts A-2 open. The magnitude of the spike is greatly reduced although it is still within the 100–200 volt range. Similar remarks apply to contacts E-2 and the rotary magnet coil. Each time relay E releases and contacts E-2 open a large voltage spike would ordinarily appear across the contacts. Capacitor 23 and resistor 24 however dissipate the energy stored in the rotary magnet winding and reduce the magnitude of the spike.

The voltage spike across the winding of the vertical or rotary magnet appearing with the opening of respective contacts A-2 or E-2 represents the completion of a step by the switch. The magnitude of the spike at terminal 25 resulting from the opening of contacts E-2 is in the order of 100–200 volts. The spike at the junction of capacitor 22 and the winding of the vertical magnet when the vertical magnet releases is also of the same magnitude. Although the latter spike is slightly reduced in magnitude at terminal 25 after passing through capacitors 22 and 23, it is still in the order of 100–200 volts. The spikes produced at terminal 25 by the releases of the vertical and rotary magnets are individually used for notifying the monitoring equipment that the first selector has undertaken a step in its operation. The spikes are transmitted through capacitor 16, diode 15 and contacts D-1 to tip conductor 6. Diode 15 is provided to isolate capacitor 16 and resistor 17 from the tip conductor. The tip conductor is slightly negative in potential and diode 15 is ordinarily reverse biased. Only the large negative spikes at terminal 25 are transmitted through the diode to the tip conductor. A similar resistor-capacitor-diode network is provided in each selector and connector in the office to enable the spikes resulting from the operations of the respective vertical and rotary magnets to be coupled to the respective tip conductors of the switch train. All of the spikes are transmitted back through the switching train to tip conductor 6, connected to the monitoring equipment.

It should be noted that the pulses on tip conductor 6 arrive in spurts, or sets. Vertical steps are taken at intervals of approximately 100 milliseconds. Thus when the first vertical magnet operates the voltage spikes received on tip conductor 6 arrive approximately every 100 milliseconds. The relay between the termination of vertical stepping and the beginning of rotary hunting (the pulsing of the rotary magnet) is greater than 100 milliseconds, and the monitoring equipment (FIG. 3) interprets the absence of pulses for more than 100 milliseconds as representing the interval between the termination of vertical stepping and the beginning of rotary hunting. During the hunting operation the rotary magnet operates approximately every 25 milliseconds. After the hunting, cut-through relay D operates to bring in the chosen second selector. The next group of pulses is derived from the stepping of the vertical magnet in the second selector. The time interval between the cessation of hunting in the first selector and the operation of the vertical magnet in the second selector (as a result of the second dialed digit) is considerably greater than 25 milliseconds. The second delay represents the separation between the end of the rotary magnet stepping pulse sequence of the first selector, and the beginning of the vertical magnet stepping pulse sequence of the second selector. In this manner the pulses from the first and second selectors and the connector arrive in identifiable spurts or groups of tip conductor 6.

Figures 4A, 4B:
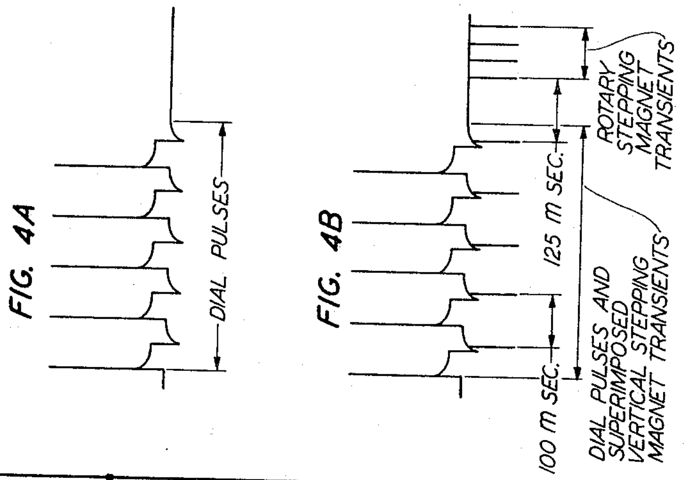
FIGS. 4A and 4B represent illustrative dial and stepping pulses derived in accordance with the principles of the invention.

The waveform appearing on tip conductor 6 may be understood with reference to FIGS. 4A and 4B. FIG. 4A shows a series of dial pulses on tip conductor 6. Although dial pulses are originally square in waveform they are somewhat mutilated by circuit inductances including the winding of relay A. The collapsing field of this relay on the open circuit portion of the dial pulse causes a large positive going spike to appear on tip conductor 6. The resulting pulses on tip conductor 6 are of the type shown in FIG. 4A. Each received pulse results in the operation of a vertical magnet. The negative spike across the magnet coil when the magnet releases is transmitted back through the switching train to the tip conductor. The transients due to stepping magnet operation, including these negative spikes, are shown in FIG. 4B. As expected they are superimposed on the dial pulses themselves. Each negative spike appears after its controlling dial pulse, and before the succeeding dial pulse. The time interval between successive vertical stepping spikes is approximately 100 milliseconds, the same time interval that separates successive dial pulses.

After the vertical steps there is a time delay of approximately 125 milliseconds. The rotary hunting then begins. The hunting is not controlled by dial pulses as there are no dial pulses at this time. The negative spikes, which are transmitted back through the switching train to the tip conductor, are not superimposed on any signal. The stepping spikes are separated by approximately 25 milliseconds. In FIG. 4B four such spikes are shown corresponding to four rotary steps.

The monitoring equipment 38 is selectively connectable to the tip conductors of all the first selectors. When the monitoring equipment becomes idle, an idle indicating signal is passed from monitor control circuit 44 over conductor 56 to seizure control circuit 31.

Circuit 31 can be of a variety of known designs. Its function is to control gate circuit 30 so that it connects the monitoring equipment to the first selector which is next seized. The tip conductors are extended to circuit 31 and this circuit recognizes seizure of a first selector by the transition from ground potential to a slightly negative potential on the tip lead of the seized first selector. Seizure control circuit 31 is provided with a timing circuit (not shown) which requires ground potential to be present on the tip lead for at least 100 milliseconds before a transition to a negative potential on this lead is recognized as a new seizure. This prevents the monitoring equipment from being connected to a first selector during inpulsing. An exclusion circuit (not shown) in seizure control circuit 31 prevents other seizures from being recognized as long as the monitoring equipment is connected. A translator (not shown) in circuit 31 translates the identity of the tip lead on which a seizure is recognized into respective signals on conductors 60 and 28. The signal on one of conductors 60 establishes in gate circuit 30 a path from the seized first selector to the monitoring equipment while all other paths remain open. The signal on conductor 28 identifies the first selector connected to the monitoring equipment. This information is required in the event that a malfunction must be punched out. The monitoring equipment remains connected to this first selector until the call is completed, if successful, or until a trouble report is punched out if the call is not successfully completed.

All signals on conductor 61 are transmitted to both dial pulse detector 36 and diode 32. Dial pulse detector 36 responds only to the positive voltage pulses shown in FIGS. 4A and 4B, i.e., dial pulses. The combination of diode 32, resistor 33, source 35 and capacitor 34 permit only the negative spikes, the pulses derived from the stepping magnets, to be transmitted to conductor 12. Thus only the negative stepping spikes appear on conductor 12. Only the dial pulses appear on conductor 37. Dial pulse detector 36 clips off the negative spikes resulting from the stepping voltages transmitted back through the switching train. The resulting waveform on conductor 37 thus comprises the original dial pulses only.

Figure 3:
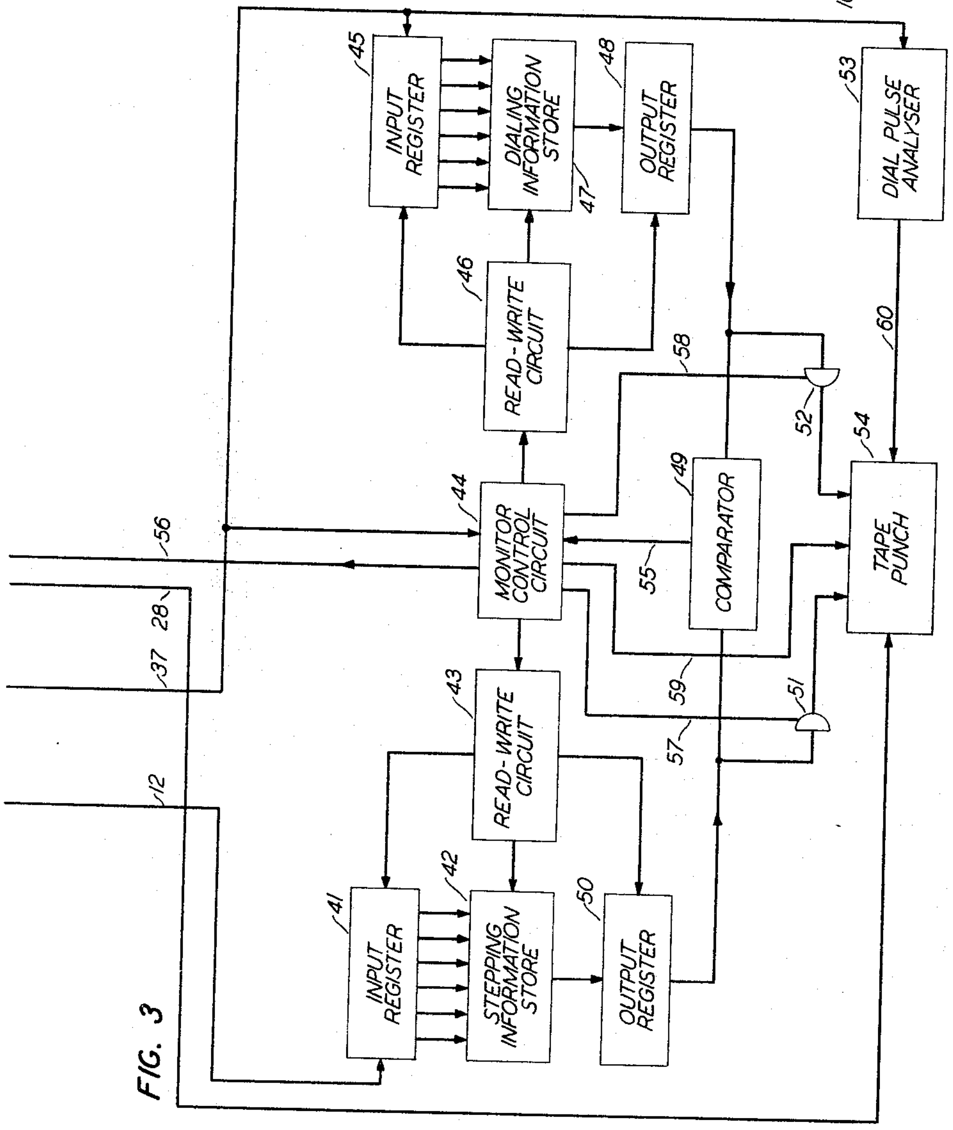

The stepping pulses on conductor 12 are applied to input register 41 (FIG. 3). The register has a number of storage positions sufficient to store any single digit. The dial pulses on conductor 37 are applied to input register 45, this input register also having a number of storage positions sufficient for storing any digit. The dial pulses are also applied to monitor control circuit 44. When the monitor control circuit detects the absence of dial pulses for a time interval sufficient to identify the beginning of the interdigit period, read-write circuit 43 is notified to control the reading of the digit stored in register 41 into the stepping information store 42. The monitor control circuit also notifies read-write circuit 46 to control the reading of the digit stored in register 45 into dialing information store 47.

After each digit is dialed, monitor control circuit 44 notifies the two read-write circuits 43 and 46 to read out the last digits stored in the respective stores 42 and 47 into output registers 50 and 48. The output registers in turn deliver the two respective digits to comparator 49 which compares them to each other. Comparator 49 notifies monitor control circuit 44 over conductor 55 of the match or mismatch. During the comparison, monitor control circuit 44 does not enable gates 51 and 52.

When the first dial pulse digit and stepping pulse digit, originally superimposed on each other on tip conductor 6 but appearing separately on conductors 37 and 12 respectively, are stored in the two input registers, monitor control circuit 44 operates the two read-write circuits each twice in succession. First, the two digits are transferred into the respective information stores, and then the digits are read out (nondestructively) into the two output registers. From the output registers the two digits are outpulsed into comparator 49, and monitor control circuit 44 is notified of the match if it exists.

Vertical stepping of a selector is followed by the rotary hunting action which occurs during the inter-digit period. Monitor control circuit 44 clears register 41 of the vertical stepping pulses by the time the rotary stepping pulses occur on conductor 12 in order that the latter pulses may be recorded in register 41. (The last pulse of the vertical stepping action on conductor 12 is separated from the first pulse of the rotary hunting action by about 125 milliseconds.) Monitor control circuit 44 allows a sufficient time for a complete digit representing the number of rotary steps to be stored in input register 41 at which time read-write circuit 43 is operated, and the information in register 41 is read into store 42. No equivalent information is read into store 47 as there are no dial pulses corresponding to the rotary steps. The rotary stepping pulses are transferred from store 42 (nondestructively) through output register 50 into comparator 49. There are no corresponding dial pulses received from output register 48. This absence of dial pulses and the presence of rotary stepping pulses are interpreted by comparator 49 as an indication that the selector performed the rotary hunting action. A signal, indicating this condition, is passed over conductor 55 to monitor control circuit 44.

The next dial pulse and stepping pulse sequences are stored in the respective input registers and then in the two information stores. Immediately after the digits are stored they are read out into the two output registers and compared for a match.

The next sequence of data arriving is a sequence of stepping pulses on conductor 12. This hunting information from the second selector is transferred to store 42 as was the rotary information from the first selector. As before, monitor control circuit 44 establishes that rotary hunting took place.

The next sequence of pulses to arrive are the third digit dial pulses on conductor 37, and the vertical stepping pulses from the connector on conductor 12. These sequences are stored and compared in the same manner as those which preceded them. Rather than the monitoring equipment next receiving only a series of rotary steps on conductor 12 it will also receive a series of dial pulses on conductor 37 which should correspond in number to the stepping pulses. Thus when the last dial pulse is received the two digits in registers 41 and 45 are transferred to the respective information stores 42 and 47. The two digits are immediately transferred to the output registers and are compared by comparator 49. If the fourth match is detected monitor control circuit 44 notifies seizure control circuit 31 over conductor 56 that the monitoring equipment is now free to be connected to the first selector to be next seized.

In the event a mismatch between respective dial and stepping digits is detected by comparator 49 during any one of its four operations, a signal is sent over conductor 55 to so notify monitor control circuit 44. A similar signal is sent over conductor 55 to notify monitor control circuit 44 of a failure of a selector to perform its rotary hunting action after vertical stepping.

When monitor control circuit 44 has been informed over conductor 55 about a mismatch between inpulsing and stepping or about a failure of a selector to perform its rotary hunting action, circuit 44 may immediately control the punch-out operation, or may delay it until all dial digits are stored in store 47. (Even though the wrong called party could be identified, the switching train may be allowed to develop to the end for the purpose of determining whether succeeding stepping operations are also improper. Other means may be provided to inhibit ringing the wrong called party.) Monitor control circuit 44 applies enabling signals to the control terminals of gates 51 and 52 over conductors 57 and 58. Over conductor 59 a signal is sent to the tape punch equipment 54 to notify it that a punch operation is to take place. The tape punch immediately punches out the identity of the first selector engaged in the switching train, the identity appearing on conductor 28. Control circuit 44 then causes read-write circuit 46 to successively transfer the four dialed digits stored in information store 47 into output register 48. After each digit is stored in the output register it is shifted out and passes through gate 52 to the tape punch equipment. The dialed digits are punched out following the identity of the first selector. Control circuit 44 then causes read-write circuit 43 to control the reading out of the six digits stored in store 42, these digits representing the vertical and rotary stepping information of the two selectors and the connector used for the call. Each digit is read out into output register 50, and from the register is shifted through gate 51 to the tape punch equipment. After the six stepping digits have been punched out control circuit 44 applies the signal on conductor 56 which notifies seizure control circuit 31 to monitor the next new call. The tape has sufficient information to not only enable a maintenance man to identify the malfunctioning switch, but to also further isolate the trouble, e.g., overstepping or understepping in either the vertical operation of a selector or connector, or the rotary operation of the connector. A failure of a selector to hunt for a next step switch is another trouble condition that can be isolated. Also revealed will be a condition known as "all paths busy." This condition is encountered when a selector finds no idle path to a next selector or connector and it is identified by the punch of the maximum number of rotary stepping digits.

There is one type of trouble for which a punch out operation may not be warranted. In the event mutilated dial pulses are received it is expected that the steps taken by the various selectors and the connector will not correspond to respective dialed digits. To punch out information indicating that a switch is operating improperly would only needlessly result in a maintenance man's service. For this reason dial pulse analyzer 53 is included in the circuit. The dial pulse waveform on conductor 37 is applied to the dial pulse analyzer. The analyzer may be any of well-known types which check the validity of each incoming pulse. For example, the ratio of the make/break times must be within minimum and maximum bounds. If the dial pulses are too distorted to expect proper switch operation a signal can be applied over conductor 60 to inhibit the punch-out operation. However, if desired, a punch may be made when the dial pulses are distorted. This punch would identify the type of dailing failure as revealed by the dial pulse analyzer over conductor 60 to tape punch 54. Also punched would be the identity of the first selector, which tape punch 54 obtains over conductor 28. The identity of the first selector, in some cases, reveals a particular trunk circuit or line finder over which the distorted dial pulses are received which helps to locate signaling troubles.

Other applications of the stepping pulse feedback are possible. For example, the vertical and rotary stepping pulses can be monitored and counted to identify a particular subscriber's line on a given line finder switch. A line finder, similar to a selector or connector, makes both vertical and rotary steps to connect one of many (up to 200) subscriber lines demanding service to a first selector. By monitoring the lien finders rather than the first selectors and by connecting the monitoring equipment to the line finder which is next seized, it is possible to identify the calling subscriber's line. The subscriber's line is identified by the identity of the connected line finder, and by the number of vertical and rotary steps which it makes. In 200 point line finders there are two subscriber lines associated with a given number of vertical and rotary steps. The identification of the subscriber's line that actually wants service can be accomplished by various known methods. For instance a signal on an additional conductor, connected from the line finder to the monitoring equipment, can identify which of the possible two subscriber lines requests service. In this manner 1 out of 200 subscribers can be identified without having to connect a circuit to each of the 200 subscriber lines.

Although the invention has been described with a certain degree of particularity it is to be understood that the above-described arrangement is illustrative only of the principles of the invention. Numerous other arrangements may be devised by those skilled in the art without departing from the spirit and scope of the invention.

What is claimed is:

1. A circuit for registering the sequential operation of step-by-step switches in a switching train comprising means coupling the windings of the vertical and rotary magnets of each switch in said train to the tip conductor of said train for transmitting to said tip conductor pulses induced by the respective releases of said vertical and rotary magnets, and means connected to the tip conductor at the first switch of said switching train for detecting and recording pulses appearing in said tip conductor as a result of the respective releases of the vertical and rotary magnets of said switches in said train.

2. A circuit for monitoring the transmission path extended by the operation of switches in a step-by-step switching train comprising registering means connected to the transmission path input of the first switch in said switching train, and means connected to each of the switches including said first switch in said switching train for applying to the transmission path extended through the respective switches pulses representative of the stepping actions taken by the respective switches.

3. A monitoring circuit in accordance with claim 2 wherein said last-mentioned means includes means for coupling the stepping magnets of each of said switches to said extended transmission path.

4. A circuit for monitoring the progress of a call through a step-by-step telephone central office comprising means connected to one of the switches in said central office for detecting particular electrical waveforms in the transmission path through said switch, and means connetced to said one switch and to switches succeeding said one switch in the same switching train for applying to the transmission paths through said respective switches said particular electrical waveform representative of the stepping actions taken by said respective switches.

5. A monitoring circuit in accordance with claim 4 in which said last-mentioned means includes means for applying to said transmission paths two sequences of said particular electrical waveform representative respectively of the vertical and rotary stepping actions taken by said switches.

6. A monitoring circuit in accordance with claim 5 in which said last-mentioned means connects the vertical and rotary stepping magnet coils of said switches to said respective transmission paths.

7. A circuit for monitoring the operations of step-by-step switches responsive to dial pulses transmitted through the transmission paths established by the operation of said switches comprising means connected to said switches for applying to said transmission paths transient signals representative of the respective stepping actions taken by each of said switches responsive to said dial pulses, and means coupled to the first switch of said switches for registering both said dial pulses transmitted through and said transient signals applied to said transmission paths.

8. A monitoring circuit in accordance with claim 7 wherein said first-mentioned means includes means for coupling the stepping magnets of said switches one at a time to said transmission paths.

9. A monitoring circuit in accordance with claim 7 further including means connected to said registering means for comparing said dial pulses and said transient signals to determine the correspondence of the stepping actions taken by said switches with said dial pulses transmitted through said transmission paths.

10. A monitoring circuit in accordance with claim 9 further including means controlled by said comparing means responsive to a lack of correspondence between said stepping actions and said dial pulses for recording the contents of said registering means.

11. A monitoring circuit in accordance with claim 7 further including means connected to said switches for applying to said transmission paths transient signals representative of the respective stepping actions taken by each of said switches independently of said dial pulses, said registering means further registering said last-mentioned transient signals.

12. A circuit for monitoring the operation of switches in a step-by-step telephone central office comprising means connected to the switches in said office for applying to the transmission paths established through each succeeding switch information representative of the stepping actions taken by the respective switches, means selectively connectable to predetermined ones of the switches in said office for first registering the dial pulses transmitted to and through said predetermined switches and for thereafter registering said information applied to the transmission paths of switches succeeding said predetermined switches, and means for comparing the dial pulses and applied information in said registering means with each other.

13. A step-by-step telephone switch having a set of input terminals, a plurality of sets of outlet terminals, and energizable magnet windings for controlling the connection of said set of input terminals to one of said plurality of sets of outlet terminals in accordance with dial pulses received at said set of input terminals characterized by means coupled to said magnet windings for applying to said set of input terminals electrical signals representative of the stepping actions taken by said switch.

14. A step-by-step telephone siwtch in accordance with claim 13 further including means connected to said set of input terminals for registering both dial pulses transmitted to said set of input terminals and said electrical signals applied to said set of input terminals.

15. A step-by-step telephone switch having a set of input terminals, a plurality of sets of output terminals, and vertical and rotary magnets for controlling the connection of said set of input terminals to one of said plurality of sets of output terminals in accordance with dial pulses received at said set of input terminals characterized by means connected between the coils of said vertical and rotary magnets and said set of input terminals for transferring energy stored in said coils to said set of input terminals upon the release of said vertical and rotary magnets.

16. In a telephone system, a transmission path, a plurality of step-by-step switches for extending said transmission path, each of said switches including a vertical and a rotary stepping magnet, relay means for each of said switches and including contacts in the energizing circuits of said vertical and said rotary stepping magnet, and means connecting each of said vertical and rotary stepping magnets to said transmission path for applying to said transmission path on opening of said contacts pulses of energy stored in the operating coils of said vertical and rotary stepping switches.

17. In a telephone system, the combination of claim 16 further comprising means connected to said transmission path for registering received dial pulses and means connected to said transmission path for registering said energy pulses from said operating coils of said vertical and said rotary stepping magnet.

No references cited.

KATHLEEN H. CLAFFY, *Primary Examiner.*

R. MURRAY, *Assistant Examiner.*